United States Patent [19]

Barbaret

[11] Patent Number: 5,615,775
[45] Date of Patent: Apr. 1, 1997

[54] HIGH-INTENSITY MAGNETIC SEPARATOR

[75] Inventor: Pascal Barbaret, Saint Chamond, France

[73] Assignee: FCB, Montreuil-sous-Bois, France

[21] Appl. No.: 593,254

[22] Filed: Jan. 29, 1996

[30] Foreign Application Priority Data

Feb. 2, 1995 [FR] France ............................. 95 01209

[51] Int. Cl.⁶ ..................................................... B03C 1/00
[52] U.S. Cl. ......................................... 209/219; 209/225
[58] Field of Search .................................... 198/813, 814, 198/861.1; 209/219, 225, 223.2, 229

[56] References Cited

U.S. PATENT DOCUMENTS

| | | | |
|---|---|---|---|
| 3,456,776 | 7/1969 | Viene | 198/813 |
| 3,870,140 | 3/1975 | Wieser | 198/861.1 X |
| 3,892,658 | 7/1975 | Benowitz | 209/219 X |
| 3,926,792 | 12/1975 | Buford | 209/219 X |
| 4,846,338 | 7/1989 | Widmer | 198/813 X |
| 4,993,542 | 2/1991 | Nomura | 198/861.1 X |
| 5,022,514 | 6/1991 | Lofberg | 198/813 |
| 5,057,210 | 10/1991 | Julius | 209/219 X |
| 5,101,980 | 4/1992 | Arvidson | 198/813 X |
| 5,162,029 | 11/1992 | Gerard | 198/861.1 X |
| 5,202,400 | 4/1993 | Breuss et al. | 198/861.1 X |
| 5,236,136 | 8/1993 | McCarty et al. | 209/219 X |
| 5,394,991 | 3/1995 | Kumagai et al. | 209/219 X |

FOREIGN PATENT DOCUMENTS 9409617  8/1994  France .

*Primary Examiner*—D. Glenn Dayoan
*Attorney, Agent, or Firm*—Collard & Roe, P.C.

[57] ABSTRACT

A magnetic separator having a chassis, a rotor and a return roll supported on the chassis, the rotor and return roll having axes extending parallel to each other, and an endless band trained over the rotor and return roll, the endless band having an upper course and a lower course, the chassis being constituted by a beam positioned between the upper and lower course of the endless band. A frame supports opposite ends of the beam projecting from the opposite sides of the endless band at a plane of support, one of the beam ends being rigidly fixed on the frame, and a removable shim is positioned at the level of the lower course of the endless band adjacent the plane of support, the removable shim supporting the beam end opposite the one beam end on the frame whereby the beam is cantilevered on the frame when the shim is removed and a space is defined between the opposite beam end and the frame, the space permitting the endless band to be dismounted from, and mounted on, the rotor and return roll. Furthermore, a tensioning device applies an operating tension to the endless band mounted on the rotor and return roll, and may be deactivated to reduce the tension.

8 Claims, 6 Drawing Sheets

HIGH-INTENSITY MAGNETIC SEPARATOR

BACKGROUND OF THE INVENTION

1. Field of the Invention

The present invention relates to a high-intensity magnetic separator for separating products of low magnetic susceptibility, which comprises a rotor consisting of a stack of pole pieces and disk-shaped permanent magnets alternatingly disposed on a shaft, a return roll whose axis is parallel to that of the rotor, and an endless band trained over the rotor and return roll under tension, the rotor and the return roll being so positioned that the plane of the upper course of the endless band is approximately horizontal. The rotor is coupled to a motor for rotating the rotor. In addition, such magnetic separators are equipped with a device for applying an operating tension to the endless band to impart thereto sufficient traction to permit it to revolve without slippage when the rotor is rotated but so limited that the risk of tearing of the band is reduced.

2. Description of the Prior Art

In apparatus of this type, the endless band serves, on the one hand, to convey the products to be sorted to the rotor and to remove the separated magnetic particles, and on the other hand, to protect the rotor against dirt and abrasion. The endless band is made of a non-magnetic sheet material of a small gage, of an order of magnitude of ⅒th of a millimeter, so as not to affect the performance of the rotor appreciably. Because the endless band is so thin, it wears and deteriorates rapidly and, therefore, it must be changed frequently.

To solve this problem, it has been suggested to provide a replaceable assembly comprised of the rotor and the return roll supported on a chassis, so that a defective assembly may be replaced by an identical one with a new endless band. The used band may then be replaced on the removed assembly in a repair shop without causing an interruption of the operation of the magnetic separator. This is expensive because it requires two assemblies for a single separator.

SUUMARY OF THE INVENTION

It is the primary object of this invention to provide a magnetic separator in which a defective endless band may be rapidly, and without the use of special tools, exchanged for a new band at the site of operation.

The above and other objects are accomplished according to the invention with a magnetic separator comprising a chassis, a rotor and a return roll supported on the chassis, the rotor and return roll having axes extending parallel to each other, and an endless band trained over the rotor and return roll, the endless band having an upper course and a lower course. The chassis is constituted by a beam positioned between the upper and lower course of the endless band, and a frame supports opposite ends of the beam projecting from the opposite sides of the endless band at a plane of support. One of the beam ends is rigidly fixed on the frame, and a removable shim is positioned at the level of the lower course of the endless band adjacent the plane of support, the removable shim supporting the beam end opposite the one beam end on the frame whereby the beam is cantilevered on the frame when the shim is removed and a space is defined between the opposite beam end and the frame, the space permitting the endless band to be dismounted from, and mounted on, the rotor and return roll. The separator further comprises a tensioning device for applying an operating tension to the endless band mounted on the rotor and return roll, and means for deactivating the tensioning device to reduce the tension.

According to a preferred feature of the present invention, the magnetic separator further comprises a counterweight disposed on an extension of the beam beyond the frame and arranged to balance at least partially the combined weight of the beam, rotor and return roll when the beam is in a cantilevered position. Advantageously, the counterweight comprises a motor means coupled to the rotor for rotating the same.

According to one embodiment, wherein the return roll has opposite shaft ends displaceable in a direction extending approximately parallel to the courses of the endless band, the tensioning device comprises spring means biased against the opposite shaft ends, and the deactivating means comprises a movable abutment for the spring means, the movable abutment being displaceable between an operating position, in which the spring means is compressed and the endless band is tensioned, and a deactivated position, in which the spring means and the endless band are relaxed. The movable abutment may be a piston, and the tensioning device and deactivating means further comprise a housing affixed to the chassis and having an axis extending approximately parallel to the courses of the endless band, the piston being arranged to glide in the housing, a rod extending from the piston through a slot in the housing and displaceable in the slot, the slot comprising two rectilinear portions extending approximately parallel to the housing axis, the two rectilinear portions being of unequal length and being interconnected by a transversely extending portion at ends of the rectilinear portions closest to the return roll whereby, when the rod is positioned at an end of the shorter rectilinear portion remote from the transversely extending portion, the spring means is compressed and, when the rod is at an end of the longer rectilinear portion remote from the transversely extending portion, the spring means is relaxed. Preferably, the rod has a sufficient length to be able to be used by an operator for displacing the piston from the operating to the deactivating position.

According to another embodiment, the tensioning device and means for deactivating the tensioning device comprise two pneumatic jacks, a common source of compressed air connected to the pneumatic jacks and adapted to apply equal pressure to opposite ends of the return roll whereby the return roll tends to be moved away from the rotor, and return spring means adapted to move the return roll towards the rotor when the pneumatic jacks are disconnected from the common compressed air source to relieve the pressure applied to the return roll ends.

The magnetic separator may further comprise means for applying to the endless band a pre-tension inferior to the operating tension by modifying the distance between the return roll and the rotor when the tensioning device is deactivated.

BRIEF DESCRIPTION OF THE DRAWING

The above and other objects, advantages and features of the present invention will become more apparent from the following detailed description of certain now preferred embodiments thereof, taken in conjunction with the accompanying somewhat schematic drawing wherein.

DETAILED DESCRIPTION OF THE PREFERRED EMBODIMENTS

Figure 1:
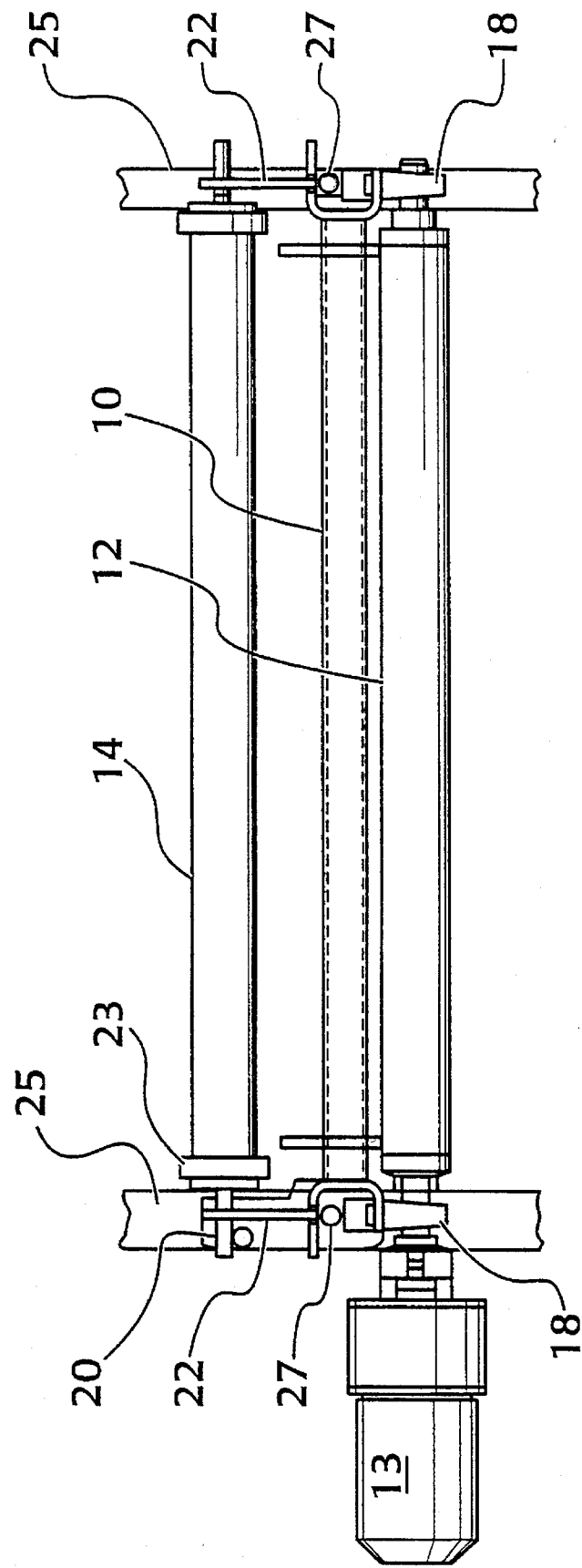
FIG. 1 is a plan view showing the assembly of a rotor, a return roll and the support chassis, without the endless band, of a high-intensity magnetic separator, according to this invention.
Figure 2:
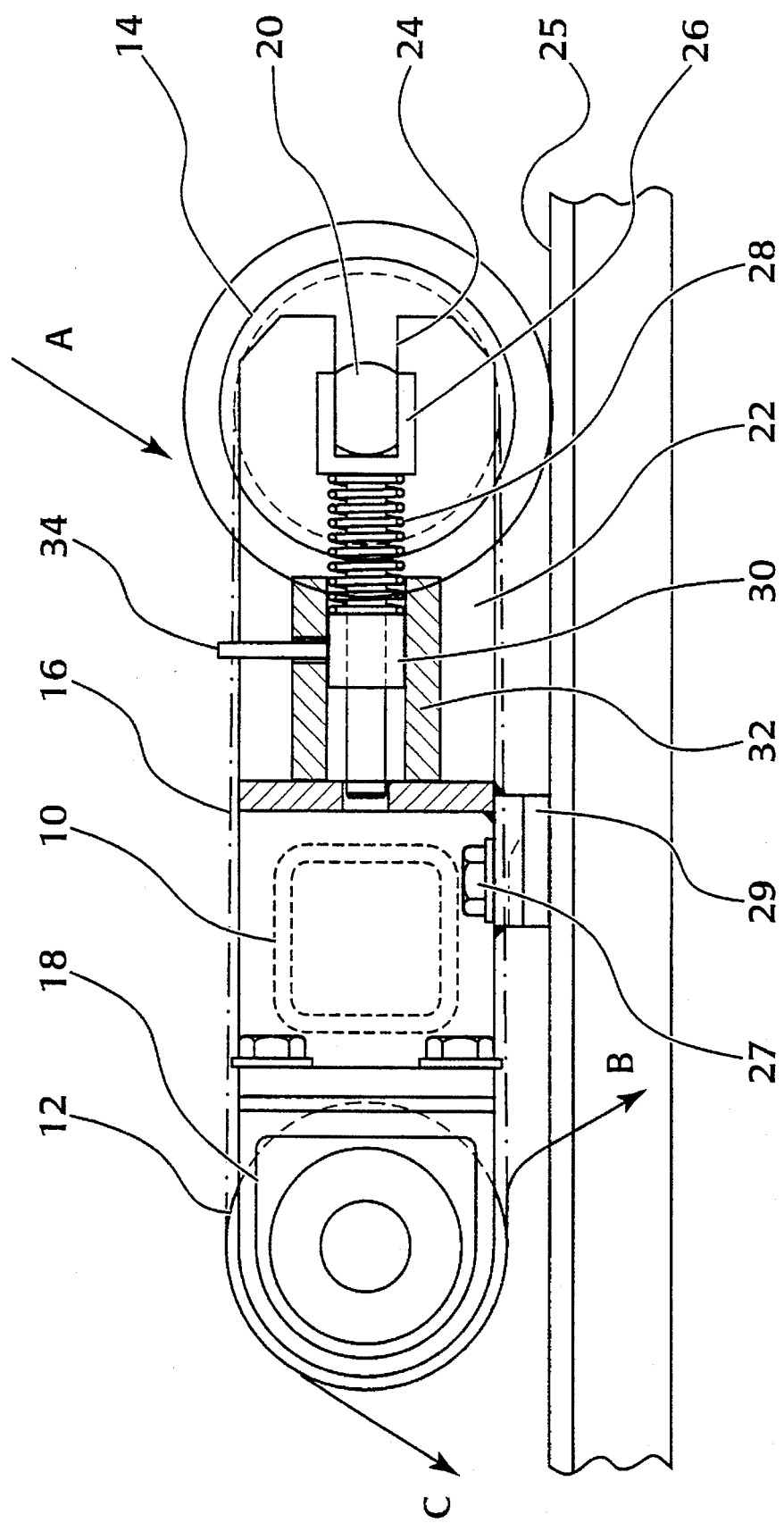
FIG. 2 is an enlarged end view of the assembly of FIG. 1, partially in section, also showing the endless band.
Figure 7:
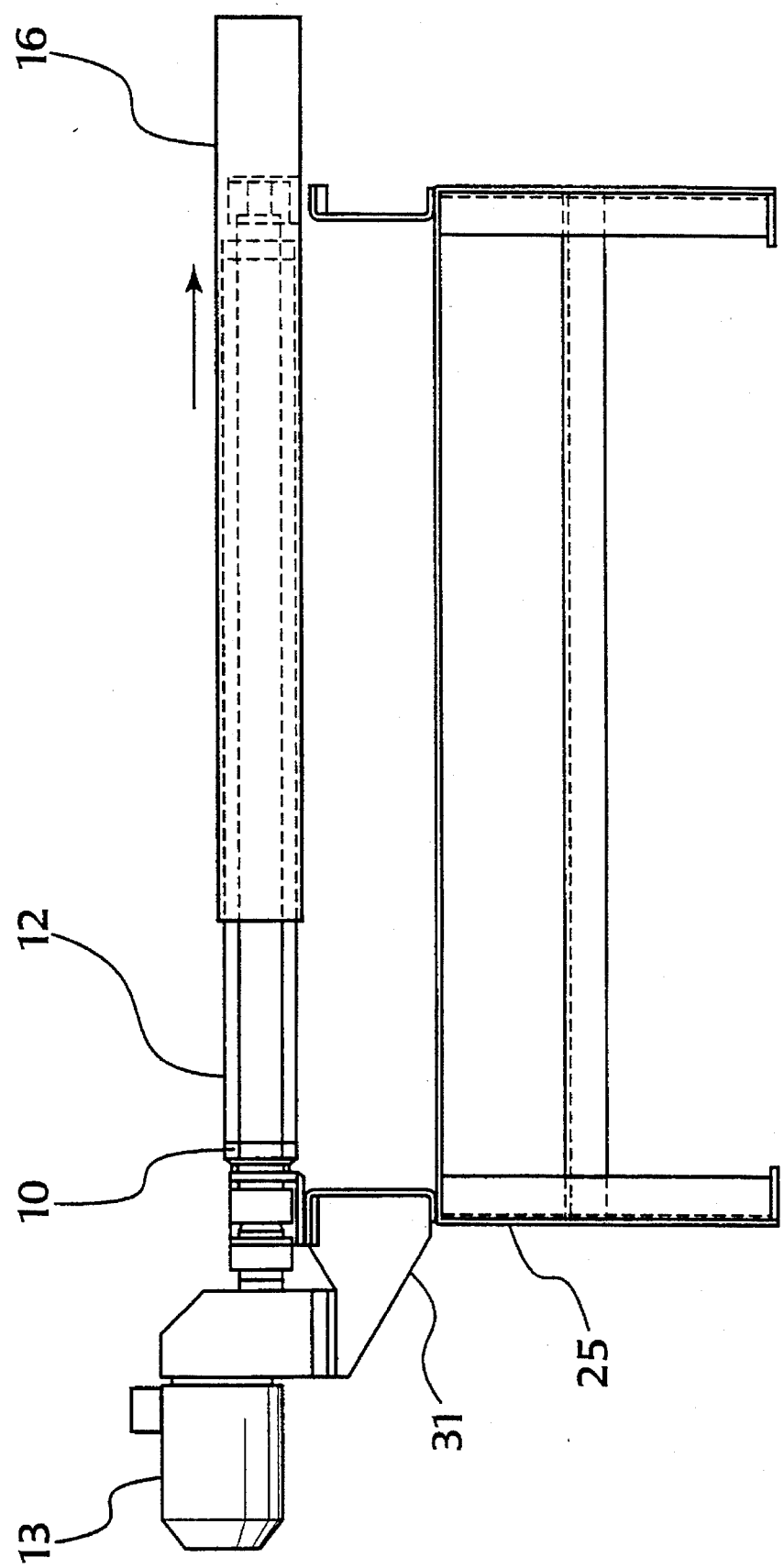
FIG. 7 is a side elevational view of the magnetic separator of FIG. 1 when the endless band is changed.

Referring now to the drawing and first to FIGS. 1, 2 and 7, there is shown a magnetic separator comprising chassis 10, rotor 12 and return roll 14 supported on the chassis, the rotor and return roll having axes extending parallel to each other. The rotor is a magnetic roll constituted by a stack of disk-shaped permanent magnets and pole pieces. Endless band 16 is trained over the rotor and return roll, the endless band having an upper course and a lower course, and chassis 10 comprises a beam positioned between the upper and lower course of endless band 16. This endless band serves to convey the products to be sorted to rotor 12, the products being dumped on the band at inlet station A, the magnetic particles separated by the rotor being collected at B, and the non-magnetic particles being discharged at C. At its opposite ends, rotor 12 has stub shafts mounted in bearings 18 affixed to chassis 10 and it is rotated by a motor assembly 13 coupled to the rotor. Return roll 14 is freely rotatably mounted on shaft 20 whose opposite ends may glide in horizontal slideways 24 in two cheeks 22 of chassis 10. The return roll has collars 23 at its opposite ends to assure centering of endless band 16.

The support chassis for rotor 12 and return roll 14 is so conceived that endless band 16 may be mounted thereon and removed therefrom simply by sliding it thereover. For this purpose, support frame 25 supports opposite ends of the beam projecting from the opposite sides of endless band 16 at a plane of support, the beam ends being affixed to frame 25 by bolts 27. One of the beam ends, which is adjacent motor assembly 13, is rigidly fixed on frame 25, a bracket 31 (FIG. 7) being interposed between the support frame and the one beam end, and the one beam end being bolted to the bracket by bolt 27. A removable shim 29 (FIG. 2) is positioned at the level of the lower course of endless band 16 adjacent the plane of support, the removable shim supporting the beam end opposite the one beam end on frame 25, whereby the beam is cantilevered on the frame when the opposite beam end is unbolted and shim 29 is removed. In this way, a space is defined between the opposite beam end and frame 25, the space permitting an operator to dismount the endless band from, and mount it on, the rotor and return roll when the band is relaxed, merely by sliding the band off the rotor and return roll, and then in a reverse direction slipping a new band on the rotor and return roll, as shown in FIG. 7. During this replacement operation, the beam is cantilevered on frame 25.

As shown in FIG. 7, motor assembly 13 is mounted on bracket 31 which forms an extension of the beam beyond frame 25 and is arranged to constitute a counterweight balancing at least partially the combined weight of the beam, rotor and return roll when the beam is in a cantilevered position. This reduces the mechanical stress on the bolts that affix the chassis to the frame and on the frame itself. If desired, this balance may be further enhanced by providing a counterweight next to the motor assembly, and in addition thereto, particularly in the case of large-capacity magnetic separator with rotors of a large diameter.

The magnetic separator further comprises a tensioning device for applying an operating tension to endless band 16 mounted on the rotor and return roll, i.e. a sufficient tension to enable the band to revolve without slippage, and means for deactivating the tensioning device to reduce the tension sufficiently to enable the endless band to be readily removed.

Figure 3:
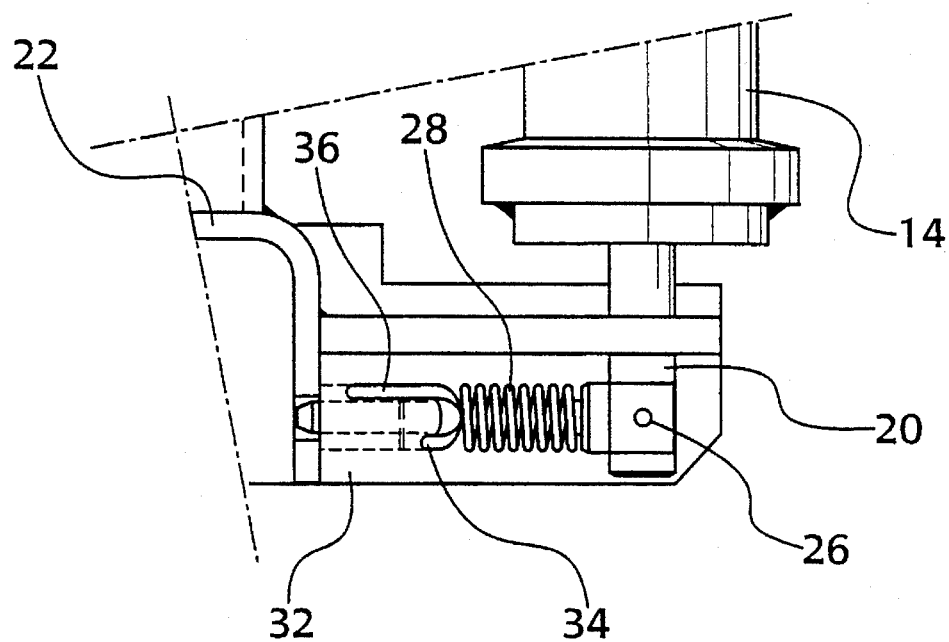
FIGS. 3 and 4 are enlarged fragmentary views showing the tensioning device in the operating and deactivated positions, respectively.
Figure 4:
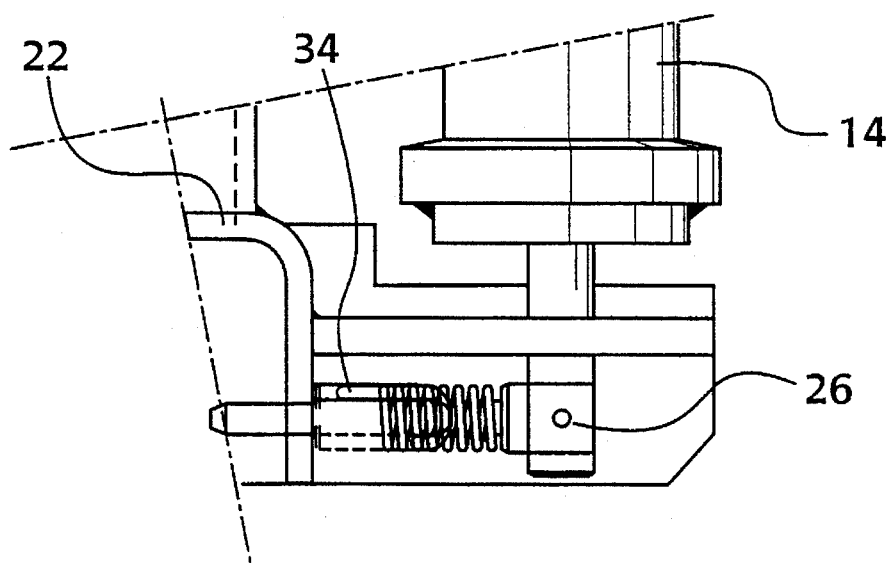

As shown in FIGS. 2–5, the opposite ends of shaft 20 bearing the return roll are displaceable in a direction extending approximately parallel to the courses of endless band 16, and in the embodiment illustrated in FIGS. 2–4, the tensioning device comprises coil spring 28 biased against the opposite shaft ends, and the deactivating means comprises movable abutment 30 for spring 28, the movable abutment being displaceable between an operating position, in which the spring is compressed and the endless band is tensioned, and a deactivated position, in which the spring and the endless band are relaxed. The illustrated movable abutment is a piston, and the tensioning device and deactivating means further comprise fork-shaped bracket 26 articulated to each end of shaft 20 and having a stem on which the piston is mounted, and housing 32 affixed to cheeks 22 of the chassis and having an axis extending approximately parallel to the courses of the endless band, the piston being arranged to glide in the housing. Rod 34 extends from piston 30 through slot 36 in housing 32 and is displaceable in the slot, the slot comprising two rectilinear portions extending approximately parallel to the housing axis, the two rectilinear portions being of unequal length and being interconnected by a transversely extending curved portion at ends of the rectilinear portions closest to the return roll (see FIGS. 3 and 4) whereby, when rod 34 is positioned at an end of the shorter rectilinear portion remote from the transversely extending portion, spring 28 is compressed (FIG. 3) and, when the rod is at an end of the longer rectilinear portion remote from the transversely extending portion, the spring is relaxed FIG. 4). In the operating position, spring 28 is compressed between fork-shaped bracket 26 and piston 30 to maintain endless band 16 tensioned, and in the deactivated position, return roll 14 is displaced towards rotor 12 to impart a slack to the band so that it may be replaced. The rod preferably has a sufficient length to be able to be used by an operator for displacing the piston from the operating to the deactivating position.

When piston 30 is in the operating position, coil spring 28 pushes return roll 14 away from rotor 12 with a sufficient force to permit the endless band to be revolved without slippage. The spring force is so selected that this force is low enough to avoid the risk of tearing the endless band. It may be regulated, for example, by interposing washers between spring 28 and bracket 26 and/or piston 30. Such an adjustment may be required if the length of the replacement band differs from that of the removed band, for example.

Figure 5:
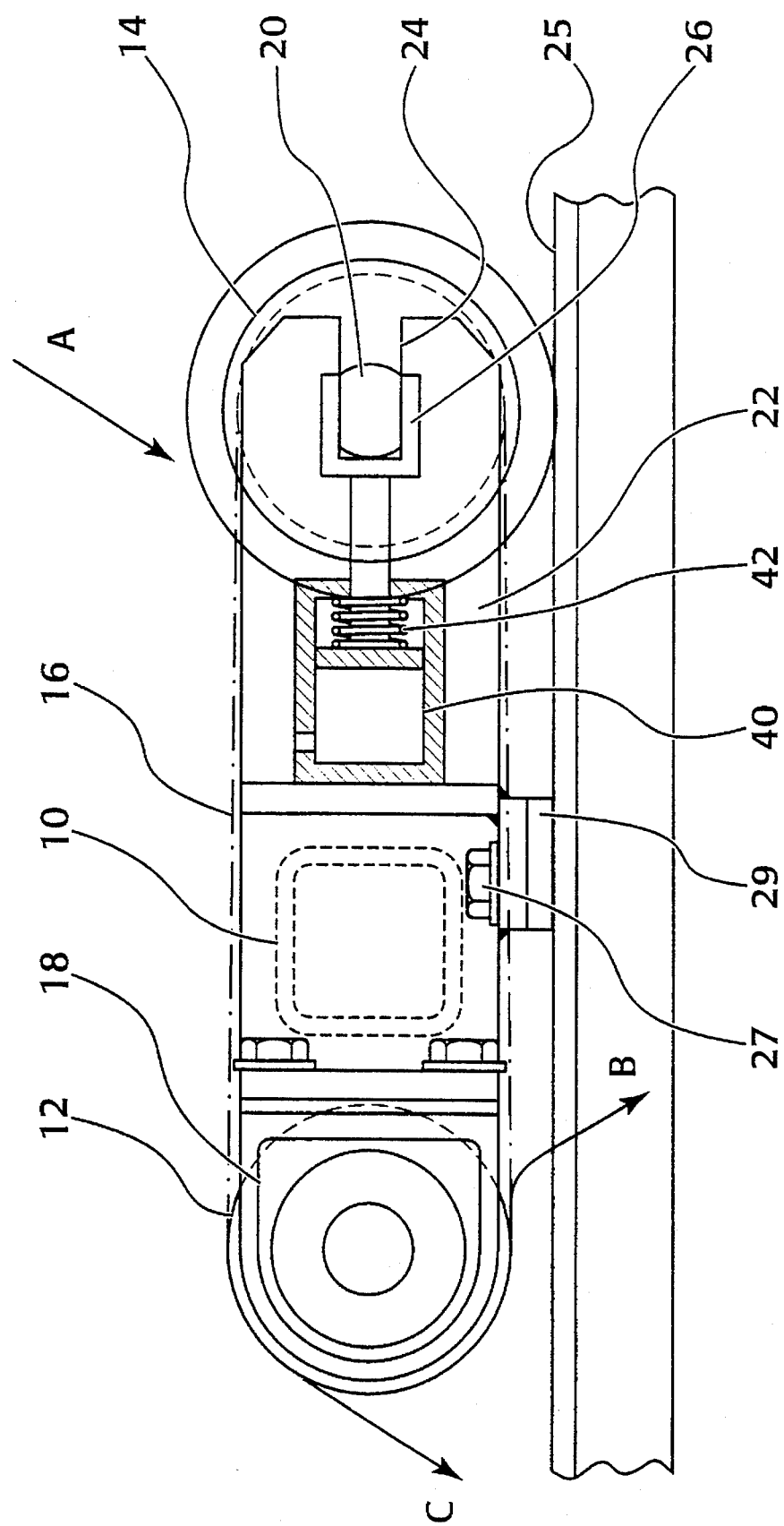
FIG. 5 is a view similar to that of FIG. 2, illustrating another embodiment of the tensioning device.
Figure 6:
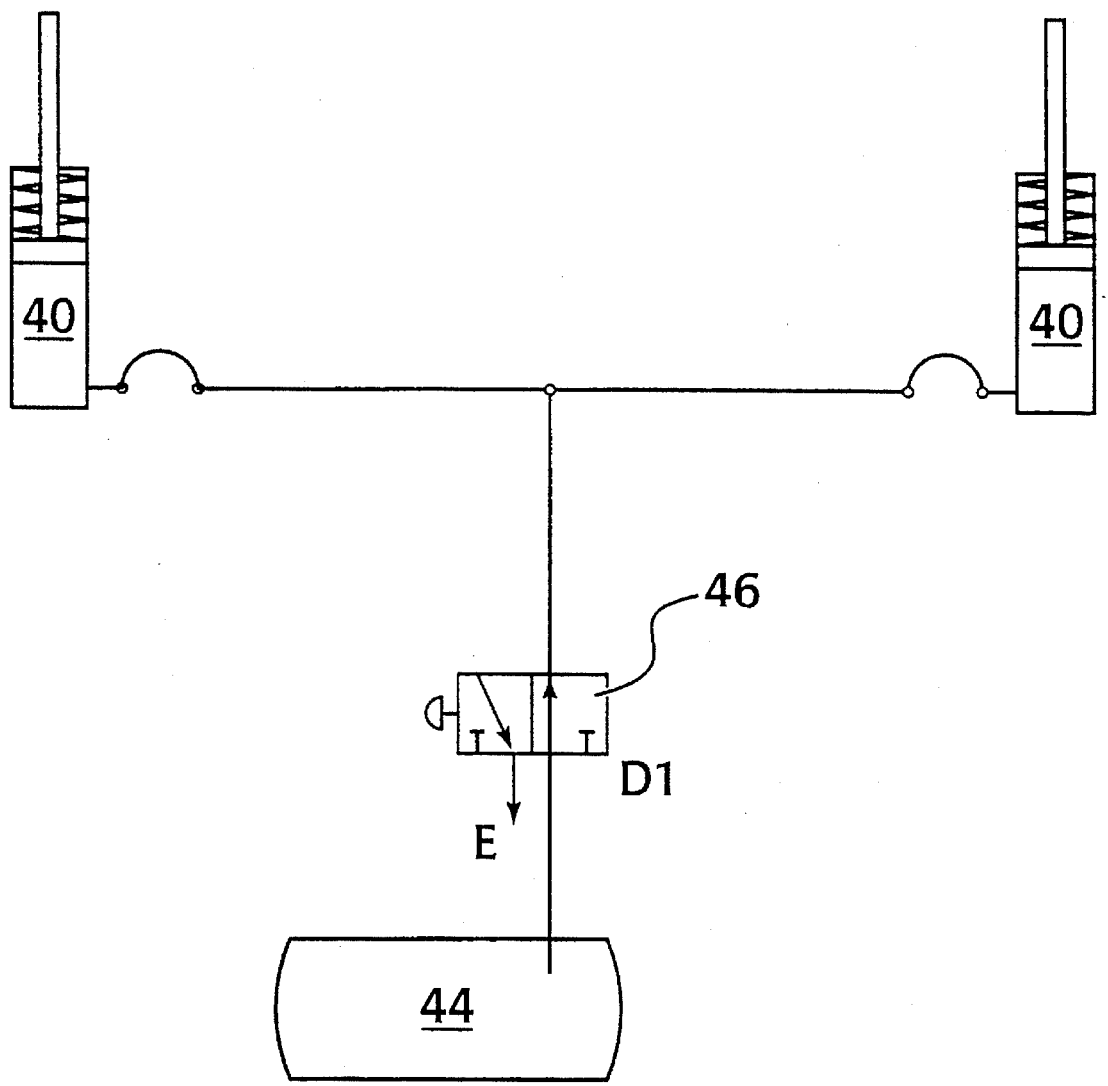
FIG. 6 is a diagram showing the circuit for feeding compressed air to the pneumatic jacks of the tensioning device of FIG. 5.

In the embodiment illustrated in FIGS. 5 and 6, the tensioning device and means for deactivating the tensioning device comprise two pneumatic jacks 40 affixed to chassis 10, common source 44 of compressed air connected to one chamber of the pneumatic jacks and adapted to apply equal pressure to opposite ends of return roll 14 whereby the return roll tends to be moved away from rotor 12, and return spring 42 in the other chamber of the jacks adapted to move the return roll towards the rotor when the pneumatic jacks are disconnected from the common compressed air source to relieve the pressure applied to the return roll ends. The piston rods of the pneumatic jacks are articulated to the opposite ends of shaft 20 bearing return roll 14. As shown in FIG. 6, manually controllable valve 46 is interposed between compressed air source 44 and pneumatic jacks 40.

In operation, sufficient compressed air is delivered to pneumatic jacks 40 from compressed air source 44 to hold return roll 14 at a sufficient distance from rotor 12 to keep endless band 16 under a uniform pressure over its entire width. When it is desired to replace the band, the delivery of compressed air is cut off by valve 46, and the jack chambers connected to compressed air source 44 are vented. Return springs 42 will then cause the return roll to move closer to roll 12, endless band 16 will be relaxed and the replacement operation can proceed in the manner described hereinabove in connection with the other embodiment of the invention. Obvious, instead of using the illustrated pneumatic jacks with a return spring, double-acting pneumatic jacks may be used, i.e. counter-pressure may be produced by delivering compressed air to the other cylinder chamber instead of mounting a return spring therein.

If the tensioning device does not permit the dismounting of the endless band, or makes the dismounting difficult, because the band is not sufficiently relaxed, as in the case, for example, in the magnetic separator disclosed in French patent No. 94 09617, the magnetic separator may further comprise means for applying to the endless band a pre-tension inferior to the operating tension by modifying the distance between the return roll and the rotor when the tensioning device is deactivated. For instance, the return roll may be mounted on the chassis as described above with reference to FIG. 2 and the pre-tensioning means may be constituted by fork-shaped elements articulated to the shaft of the return roll, each fork-shaped element comprising a screw-threaded part carrying a nut bearing on an element of the chassis forming an abutment. By tightening or loosening the nut, one may change the distance between the return roll and the rotor. The rotation of each nut may be controlled by a friction clutch or a similar device to limit the pre-tension.

What is claimed is:

1. A magnetic separator comprising (a) a chassis, (b) a magnetic rotor and a return roll supported on the chassis, the rotor consisting of a stock of disk-shaped pole pieces and permanent magnets, and the rotor and return roll having axes extending parallel to each other, (c) an endless band trained over the magnetic rotor and return roll, the endless band having an upper course and a lower course, and the endless band serving to convey products to be separated to the magnetic rotor and to remove magnetic particles separated by the rotor, (1) the chassis being constituted by a beam positioned between the upper and lower course of the endless band, (d) a frame supporting opposite ends of the beam projecting from the opposite sides of the endless band at a plane of support, (1) one of the beam ends being rigidly fixed on the frame, (e) a removable shim positioned at the level of the lower course of the endless band adjacent the plane of support, the removable shim supporting the beam end opposite the one beam end on the frame whereby the beam is cantilevered on the frame when the shim is removed and a space is defined between the opposite beam end and the frame, the space permitting the endless band to be dismounted from, and mounted on, the rotor and return roll, (f) a tensioning device for applying an operating tension to the endless band mounted on the rotor and return roll, and (g) means for deactivating the tensioning device to reduce the tension.

2. The magnetic separator of claim 1, wherein the return roll has opposite shaft ends displaceable in a direction extending approximately parallel to the courses of the endless band, the tensioning device comprises spring means biased against the opposite shaft ends, and the deactivating means comprises a movable abutment for the spring means, the movable abutment being displaceable between an operating position, in which the spring means is compressed and the endless band is tensioned, and a deactivated position, in which the spring means and the endless band are relaxed.

3. The magnetic separator of claim 2, wherein the movable abutment is a piston, and the tensioning device and deactivating means further comprise a housing affixed to the chassis and having an axis extending approximately parallel to the courses of the endless band, the piston being arranged to glide in the housing, a rod extending from the piston through a slot in the housing and displaceable in the slot, the slot comprising two rectilinear portions extending approximately parallel to the housing axis, the two rectilinear portions being of unequal length and being interconnected by a transversely extending portion at ends of the rectilinear portions closest to the return roll whereby, when the rod is positioned at an end of the shorter rectilinear portion remote from the transversely extending portion, the spring means is compressed and, when the rod is at an end of the longer rectilinear portion remote from the transversely extending portion, the spring means is relaxed.

4. The magnetic separator of claim 3, wherein the rod has a sufficient length to be able to be used by an operator for displacing the piston from the operating to the deactivating position.

5. The magnetic separator of claim 1, wherein the tensioning device and means for deactivating the tensioning device comprise two pneumatic jacks, a common source of compressed air connected to the pneumatic jacks and adapted to apply equal pressure to opposite ends of the return roll whereby the return roll tends to be moved away from the rotor, and return spring means adapted to move the return roll towards the rotor when the pneumatic jacks are disconnected from the common compressed air source to relieve the pressure applied to the return roll ends.

6. The magnetic separator of claim 1, further comprising means for applying to the endless band a pre-tension inferior to the operating tension by modifying the distance between the return roll and the rotor when the tensioning device is deactivated.

7. The magnetic separator of claim 1, further comprising a counterweight disposed on an extension of the beam beyond the frame and arranged to balance at least partially the combined weight of the beam, rotor and return roll when the beam is in a cantilevered position.

8. The magnetic separator of claim 7, wherein the counterweight comprises a motor means coupled to the rotor for rotating the same.

* * * * *